US011853509B1

(12) United States Patent
Pundak et al.

(10) Patent No.: US 11,853,509 B1
(45) Date of Patent: Dec. 26, 2023

(54) USING A CAMERA TO SUPPLEMENT TOUCH SENSING

(71) Applicant: Microsoft Technology Licensing, LLC, Redmond, WA (US)

(72) Inventors: Gilad Pundak, Rehovot (IL); Eran Arbel, Netanya (IL); Ben Fishman, Herzelya (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/662,478

(22) Filed: May 9, 2022

(51) Int. Cl.
| G06F 3/041 | (2006.01) |
| G06F 3/01 | (2006.01) |
| G06V 40/10 | (2022.01) |
| G06V 10/80 | (2022.01) |
| G06F 3/0354 | (2013.01) |

(52) U.S. Cl.
CPC ............ *G06F 3/0418* (2013.01); *G06F 3/011* (2013.01); *G06F 3/03545* (2013.01); *G06V 10/80* (2022.01); *G06V 40/107* (2022.01)

(58) Field of Classification Search
CPC .... G06F 3/011; G06F 3/03545; G06F 3/0418; G06V 10/80; G06V 40/107
See application file for complete search history.

(56) References Cited

U.S. PATENT DOCUMENTS

| 8,669,959 | B2 | 3/2014 | Morrison et al. |
| 8,933,912 | B2 | 1/2015 | Ambrus et al. |
| 10,324,563 | B2 * | 6/2019 | Tretter ...................... G06T 7/50 |
| 10,909,769 | B1 | 2/2021 | Choi et al. |
| 2010/0289752 | A1 | 11/2010 | Birkler |
| 2016/0231862 | A1 * | 8/2016 | Tretter ...................... G06T 7/12 |
| 2017/0316193 | A1 | 11/2017 | Manabe et al. |
| 2022/0050528 | A1 | 2/2022 | Wu et al. |
| 2022/0050577 | A1 | 2/2022 | Birenberg et al. |

FOREIGN PATENT DOCUMENTS

| CN | 102637090 A | 8/2012 |
| WO | 2012056864 A1 | 5/2012 |

OTHER PUBLICATIONS

Qian, Sun, "Novel Interfaces for Modeling and Painting", In Doctoral Dissertation of Nanyang Technological University, 2014, 116 Pages.
"Invitation to Pay Additional Fees Issued in PCT Application No. PCT/US23/013569", dated May 17, 2023, 9 Pages.
"International Search Report and Written Opinion Issued in PCT Application No. PCT/US23/013569", dated Jul. 12, 2023, 16 Pages.

* cited by examiner

*Primary Examiner* — Michael Pervan
(74) *Attorney, Agent, or Firm* — Alleman Hall Creasman & Tuttle LLP (57) ABSTRACT

One example provides a computing device comprising a touch sensor, a camera, a logic subsystem, and a storage subsystem. The storage subsystem comprises instructions executable by the logic subsystem to receive image data from the camera; determine, based on the image data, information regarding one or more of a hand of a user or a stylus held by the user; and based at least on the information regarding one or more of the hand of the user or the stylus held by the user, control operation of the touch sensor.

20 Claims, 5 Drawing Sheets

FIG. 7

USING A CAMERA TO SUPPLEMENT TOUCH SENSING

BACKGROUND

A computing device may utilize one or more touch sensors, such as a touch-sensitive display and/or a trackpad, to receive user inputs made via hand and/or stylus. Touch inputs may be used for a variety of functions, such as for controlling a pointer displayed on the touch-sensitive display, selecting displayed items, and/or performing drawing and/or writing functions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a computing device comprising a touch sensor, a camera, a logic subsystem, and a storage subsystem. The storage subsystem comprises instructions executable by the logic subsystem to receive image data from the camera; determine, based on the image data, information regarding one or more of a hand of a user or a stylus held by the user; and based at least on the information regarding one or more of the hand of the user or the stylus held by the user, control operation of the touch sensor.

DETAILED DESCRIPTION

As mentioned above, computing devices may include touch sensors to receive user inputs. However, various factors may pose challenges in interpreting touch sensor data. For example, a user's handedness (right or left) may impact the operation of palm rejection algorithms for a touch sensor. Thus, as incorrect determination of handedness may lead to errors in palm rejection. Also, hand size (finger size and/or palm size) may impact interpretation of touch sensor data, as touch data corresponding to larger hands may give rise to different touch sensor signals than touch data corresponding to smaller hands. As more detailed examples, a finger touch from a larger hand may erroneously be interpreted as a palm touch, while a palm touch from a smaller hand may erroneously be interpreted as a finger touch.

Various methods may be used to address such issues. For example, grip sensor data from a stylus may be used to help determine a user's handedness. However, determining handedness form stylus grip sensor data may be error-prone. A computing device also may provide a user setting for handedness. However, users may not be aware of the availability of this setting. Further, the setting may need to be reconfigured when a different user having a different handedness uses the device. With regard to hand size, algorithms that analyze touch inputs may be configured for a wide range of possible hand sizes, thereby sacrificing some sensitivity to accommodate a range of users.

Accordingly, examples are disclosed that relate to supplementing touch sensing with image data from a camera. The use of image data may provide for more reliable and accurate determinations of handedness and/or hand size classification, for example, than methods that utilize touch sensing data without image data to determine such user characteristics. The determination of handedness and/or hand size may help to reduce errors in the application of palm rejection algorithms and/or other touch sensor data processing.

In some examples, an on-device camera used to supplement touch inputs may be configured to as a human presence camera. Such a camera may remain in an "on" state during computing device use. A human presence camera may provide image data to a dedicated image sensor processor that is separate from a main processor (e.g. a central processing unit (CPU) or SoC (system on chip)) of a computing device. The image sensor processor may perform various processing on image data, such as detecting a human presence, as well as determining handedness/hand size and/or stylus information, and may provide outputs of such information to other processing hardware on a computing device. In such examples, the image sensor processor may be configured not to output image data or biometrics that can be used to identify a user. The use of such a separate processor for processing image data from a human presence camera may help to protect user privacy relative to cameras that provide image data to a main device SoC or CPU. This may allow handedness, hand size, and/or stylus data to be determined while maintaining user privacy. In other examples, any other suitable computing device camera may be used to supplement touch sensing.

Figure 1:
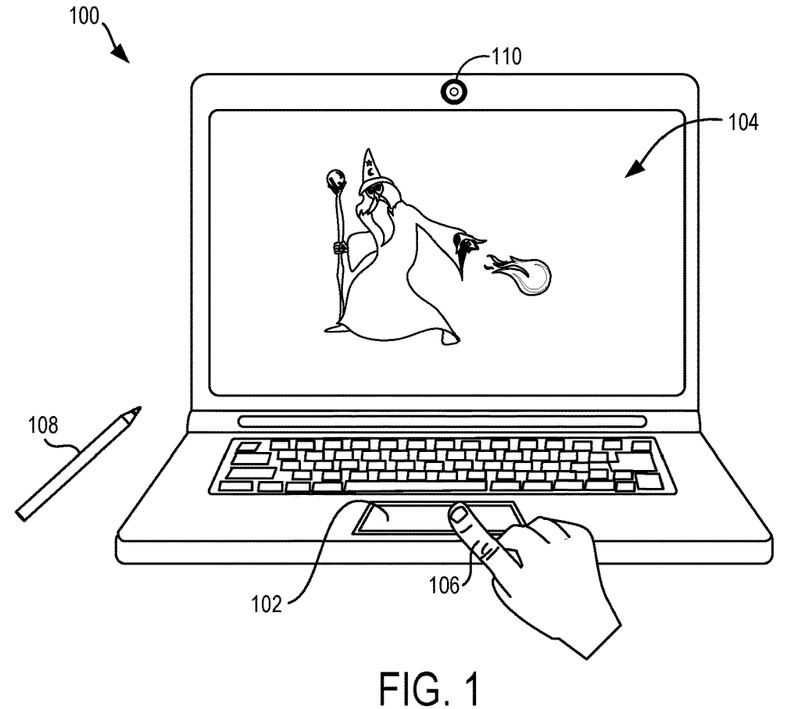
FIG. 1 shows an example touch-sensitive display device comprising a camera.

FIG. 1 shows an example computing device 100 in the form of a laptop computer that may implement aspects of the present disclosure. Computing device 100 includes a trackpad 102 and touch-sensitive display 104. A user may provide user inputs to the trackpad by touching trackpad 102 with a body part (e.g. hand 106) and/or stylus 108. Similarly, a user may provide user inputs via the touch-sensitive display 104 by touching the display with a body part (e.g. hand 106) and/or stylus 108. In some examples, trackpad 102 and/or touch-sensitive display 104 also may be configured to detect near-touches as inputs. The term "touch input," "touching," and the like as used herein include physical touches as well as near-touches that can be sensed by a touch sensor.

Computing device 100 further includes a camera 110. In some examples, camera 110 may take the form of a human presence camera that is always on and that provides image data to a secure image sensor processor. The image sensor processor may determine information regarding the user's hand 106 and stylus 108, such as information regarding handedness, hand size, and/or stylus type, among other information. The term "stylus" may represent any input device held by a user to make inputs via a touch sensor. In some examples, styluses may have a form factor similar to a pen, and/or may communicate with a computing device us via the touch sensor using a communication protocol.

Trackpad 102 and touch-sensitive display 104 each is configured to detect the position of a touch and translate such position to a position on the touch-sensitive display 104. In some examples, trackpad 104 and touch-sensitive display 108 each may utilize a capacitive sensing subsystem having a plurality of driving electrodes (not shown in FIG. 1) and a plurality of sensing electrodes (not shown in FIG. 1) to form an arrangement of sensing nodes. The presence of a finger, stylus or other object touching the trackpad 104 is detected by measuring changes to capacitance at the sensing node(s) that are touched. In other examples, trackpad 104 and/or touch-sensitive display 108 each may utilize another touch sensing technology, such as self-capacitance, resistive touch sensing, inductive touch sensing, and/or optical touch sensing.

Figure 2:
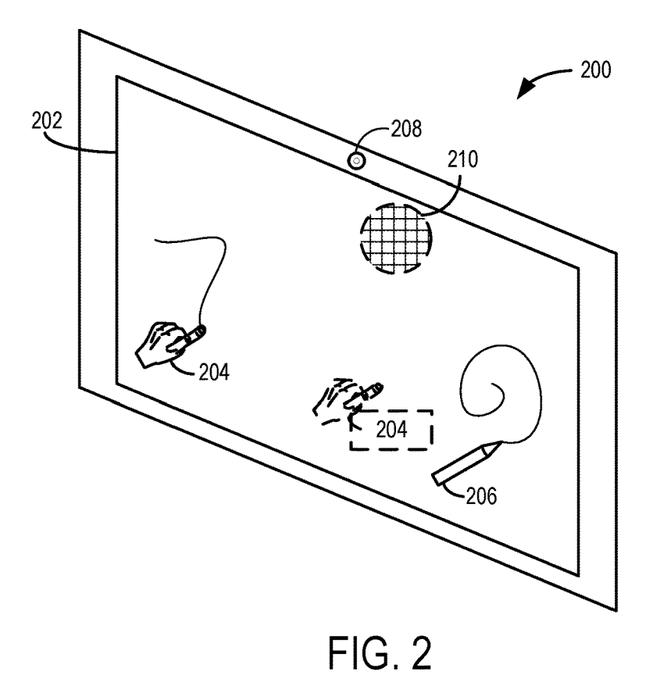
FIG. 2 shows another example touch-sensitive display device comprising a camera.

FIG. 2 shows another example of a computing device 200 including a touch-sensitive display 202 that may implement aspects of the present disclosure. Computing device 200 comprises a large-format display device suitable for use in a conference room or classroom setting. Computing device 200 may be configured to sense touches from a human body (e.g. hand 204) and/or a stylus 206. In some examples, computing device 200 may be configured to receive touches from multiple users simultaneously, as indicated by hand 205.

Computing device 200 further comprises a camera 208. Camera 208 may take the form of a human presence camera that is always on and that provides image data to a secure image sensor processor. As described above, the image sensor processor may determine information regarding the user's hand 204 (and hand 205) and stylus 206, such as information regarding handedness, hand size, and/or stylus type, among other information. The image sensor processor also may determine other information, such as how many styluses the system is using, a type of each stylus of a plurality of styluses, and how many persons are present within a field of view of camera 208. In other examples, camera 208 may take any other suitable form.

Touch-sensitive display 202 further comprises an array of electrodes, indicated schematically as electrode array 210, positioned within the touch-sensitive display 202. Electrode array 210 may comprise a plurality of drive electrodes and a plurality of sensing electrodes to form a plurality of sensing nodes for sensing touch capacitively. In other examples, touch-sensitive display 200 may comprise a self-capacitance, a resistive and/or an optical touch sensing mechanism, in addition to or alternatively to a capacitive sensing mechanism.

Computing device 100 and computing device 200 are examples of computing devices that may implement aspects of the examples disclosed herein. Other example computing devices include tablet devices, smart phones, and desktop computers (including all-in-one computers) that utilize integrated or external touch sensors.

Figure 3:
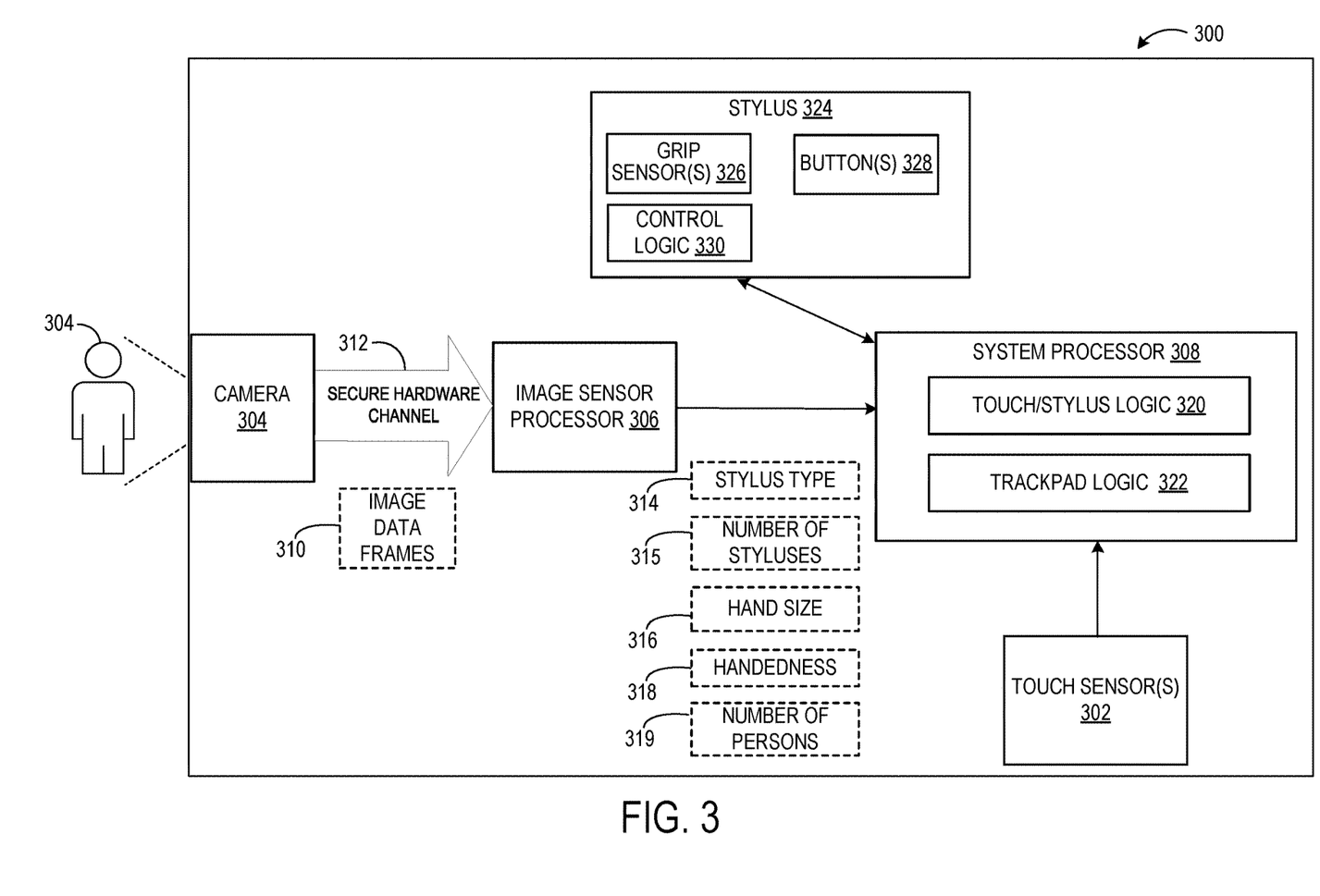
FIG. 3 shows a block diagram of an example computing system configured to use image data from a camera to control operation of a touch sensor.

FIG. 3 schematically shows a block diagram of an example computing device 300. Computing devices 100 and 200 are examples of computing device 300. Computing device 300 comprises one or more touch sensors 302 and a camera 304. Touch sensor(s) 302 may comprise one or more of a touch-sensitive display or a trackpad in some examples. Camera 304 may comprise a human presence camera in some examples.

Computing device 300 further comprises an image sensor processor 306 and system processor 308 (e.g. a CPU or SoC in some examples). Image sensor processor 306 is configured to receive image data frames 310 from camera 304 via a secure hardware channel 312, and to process the image data separately from system processor 308. In this manner, image data processing is performed securely in image sensor processor 308. As described above, image sensor processor 308 may be configured to analyze image frames 310 to determine information regarding touch inputs being made at touch sensor(s) 302. For example, image sensor processor 308 may determine information such as stylus type 314, a number of styluses being used 315, hand size 316 (including finger and/or palm size in some examples) for each of one or more hands, handedness 318 for each of one or more hands, and a number of persons 319, as examples.

In some examples, a determination of hand size 316 may comprise a size classification. As one illustrative example, hands may be classified by image sensor processor 304 into smaller, medium, and larger classifications. In other examples, hands may be classified into fewer than three classifications, such as smaller and larger, or into more classifications than three.

In some examples, machine learning algorithms may be applied on the image data to classify a hand size 316. As one example, a suitable feedforward neural network model (e.g. a convolutional neural network) may be trained using labeled images of different hands using a similar computing device. The training data further may comprise images taken under different lighting conditions, different backgrounds, and may include images of hands with different skin tones and textures. The training data may be labeled with classifications such as smaller, medium, and larger. Such a trained machine learning function may be trained to output, for example, probabilities that an imaged hand falls within any of the classifications used by the function. A most likely classification may be selected as the classification for the hand. Any suitable training algorithms may be used to train such a neural network, such as back propagation using a suitable cost function (e.g. a quadratic cost or cross-entropy cost, among other examples).

In other examples, a rules-based algorithm may be used to classify hand sizes. As one example, image sensor processor 306 may determine a distance of the user from the camera, for example using simplified rectangle similarity to determine a depth distance. Then, image sensor processor 306 may calculate a number of pixels within one or more image(s) that the user's hand occupies, and then extrapolate an estimate of hand size based on the pixels occupied and the depth distance. The determined hand size may be compared with one or more threshold values to classify the hand size. In some examples, image sensor processor 306 may have prior knowledge of one or more other parameters relating to a user's body, such as the size of the user's head, a distance between the user's eyes, and/or a shoulder-to-shoulder distance. The known parameter may be compared to a number of pixels occupied by that portion of the body in one or more image(s), and this proportion may be used to extrapolate a hand size from the number of pixels the hand occupies. Further, such computations may be informed by known variables of the image sensor, including lens characterization, optical focus, and optical stack field-of-view. Even in cases where such other parameters are unknown, the size of the computing device, for example, can be used for such extrapolation, as in many cases, the image data will capture at least a portion of the computing device (e.g. laptop keyboard).

Various approaches also may be taken to determine handedness 318. In some examples, rules-based approaches may be used. As a more specific example, upon receipt of a touch input, image data may be analyzed by image sensor processor 306 to identify which hand is touching the touch sensor (e.g. by which arm extends toward the touch sensor). As another example, user touch patterns over time may be monitored, and a user's handedness may be determined based upon which hand is used for a greater number of touches, and/or which hand is used for touches that are likely to be performed with a user's favored hand (e.g. inputs involving writing text).

Various approaches also may be taken to recognizing stylus type 314. In some examples, images of a stylus may be analyzed by image sensor processor 306 for markings that are characteristic of specific stylus types, such as optical codes (e.g. a barcode or other optically readable tag(s)). In other examples, pattern matching algorithms may be used to match images of a stylus captured by camera 304 with stored images of styluses. In yet other examples, a trained machine learning function may be configured to classify image data from camera 304 and output a most probable type of stylus. System processor 308 may then use the determined stylus type to select a communication protocol to use for communicating with the stylus. This may reduce the amount of time taken to identify a stylus type and select a communication protocol, and thus may help to avoid any disruption to a user experience due to a delay in stylus type identification and communication protocol selection.

In further examples, image data from camera 304 may be used to determine whether the computing device is being picked up or transported, such that the touch sensor may ignore inadvertent touch inputs during such periods.

Image sensor processor 306 passes information resulting from image data processing (e.g. stylus type 314, hand size 316, and/or handedness 318) to system processor 308. At system processor 308, touch/stylus logic 320 for interpreting touch-sensitive display inputs, and/or trackpad logic 322 may use the determined information to set a touch input mode. As mentioned above, data passed to system processor 308 may not include raw image data or biometric data, thereby helping to keep such information secure.

Touch/stylus logic 320 of system processor 308 may communicate with stylus 324 when stylus 324 is being used for touch inputs. Stylus 324 includes one or more grip sensor(s) 326, one or more button(s) 328 and/or other input devices, and control logic 330. Different communication protocols between stylus 324 and touch sensor(s) 302 may be used depending on a stylus type of stylus 324. Thus, image data from camera 304 may be used to identify stylus type 314 of stylus 324. This may provide for quicker identification of stylus type than identifying stylus type from signals received via touch sensor(s) 302.

In some examples, in addition to image data from camera 304, other data also may be used to help determine handedness, hand size, stylus type, and/or other suitable information. For example, touch sensor data from touch sensor(s) 302 and/or grip data from grip sensor(s) 326 on stylus 324 may be used to help determine such information. The terms "fuse," "fusion," and the like may be used to refer to the use of data from two or more different sensors to determine handedness, hand size, and/or other information. The fusion of different types of sensor data for determining such information may provide redundancy that helps to increase a confidence in the determination. Such redundancy may be helpful, for example, where data from sensors may change in quality or availability over time or between individual devices. As a more specific example, the fusing of touch sensor data and image data to determine handedness, hand size, and/or stylus type may allow image data to be used for a higher certainty determination when available, and allow touch sensor data and/or stylus grip sensor data to be used when image data is not available (e.g. when a user obstructs a camera). In some examples, upon detecting that the camera is obstructed, in response the computing device may determine information regarding one or more of the hand of the user and the stylus based at least upon data from touch sensor data and/or stylus sensor data (e.g. stylus grip sensor data). Further, in some examples, touch sensor data, image data, and grip sensor data from a stylus grip sensor all may be fused to detect handedness and/or hand size. The use of data from three different sensors to determine handedness and/or hand size may provide for a higher certainty determination than the use of one or two sensor signals. This also may provide for the fusion of two of these signals even where a third is not currently available, thereby providing for higher certainty than the use of a single signal. It will be understood that any other suitable sensor also may be used to provide additional information. Examples include, but are not limited to, sensors that sense whether a foldable computing device (e.g. a laptop, foldable tablet or foldable phone) is in an open or closed position (e.g. a Hall effect sensor), an ambient light sensor, etc.

Data may be fused at any suitable location in a sensor data processing pipeline. In some examples, different sensor pipelines may be used to determine handedness, hand size and/or stylus type independently, and each may output a determination along with a confidence level. In such examples, where the data from different determinations is ambiguous, a computing device may consider the confidence levels of each determination in deciding which determination to use, and may choose to ignore or use a determination based upon confidence level. This may help to avoid errors in determining handedness, hand size, and/or stylus type based upon using a lower confidence determination. In other examples, sensor data from two or more sensors may be combined into a feature vector for inputting into a trained machine learning function that determines a probable handedness classification, hand size classification, and/or stylus type classification based upon the feature vector. Examples of such machine learning functions include various neural network architectures, including the examples described above.

Further, in some examples, sensor fusion may be used when a primary sensing mode for detecting handedness, hand size, and/or stylus type provides a determination with a confidence level below a particular value. A confidence level for an image-based determination may depend, for example, on various factors such as lighting conditions, distance of a user from the camera, user movement, and/or objects obstructing a view of the user's hands or stylus, among other possible factors.

Information regarding a user hand or stylus may be used in various manners to control computing device operation. As one example, not all touch inputs detected by the touch sensor may correspond to intended user inputs. For example, a user may use a stylus or finger to provide touch input on a surface of the touch sensor while another portion of the user's hand (e.g. a palm) also contacts the touch sensor. Palm rejection algorithms are used to ignore touches from portions of a touch sensor when a palm-shaped signal is sensed by the touch sensor. However, a region of the touch sensor that is restricted from being used for inputs varies depending upon a handedness of a user.

Figure 4:
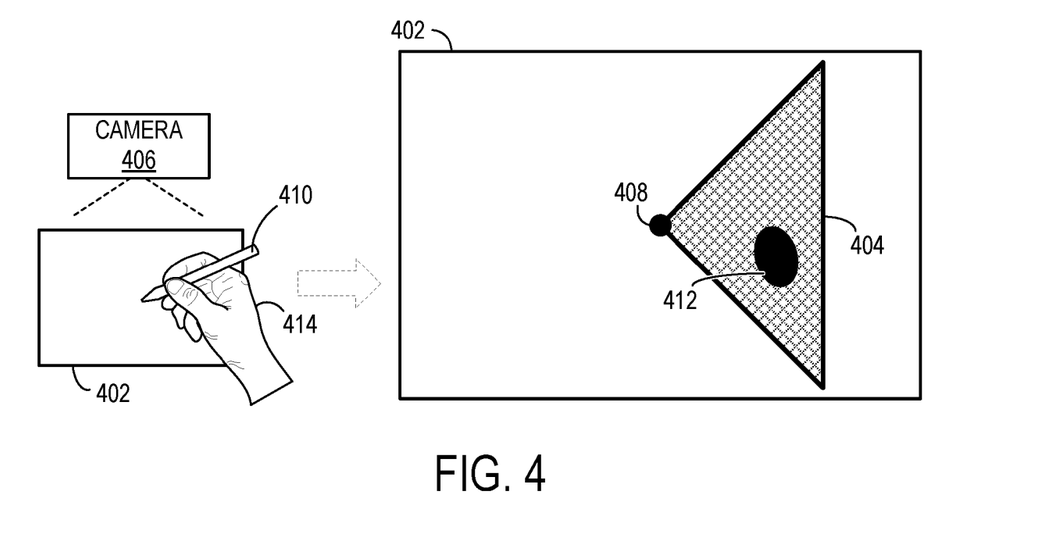
FIGS. 4-5 show example touch restriction regions that may be utilized for a touch sensor based on handedness and/or hand size as determined using image data.

Thus, image data regarding handedness can be used to adjust the location of a touch restriction region on the touch sensor. FIG. 4 schematically shows an example touch sensor 402 defining a touch restriction region 404 for a user determined to be right-handed based upon image data from a camera 406. In this example, touch sensor 402 senses a stylus touch 408 from a stylus 410, and a hand touch 412 arising from a portion of the user's right hand 414 that contacts the display surface while holding the stylus. As a computing device (not shown in FIG. 4) incorporating touch sensor 402 and camera 406 is aware that the user is using a stylus and is right-handed (e.g. by image analysis performed using a secure image sensor processor), the computing device defines touch restriction region 404, in which it is likely that a palm touch may occur based upon a location of stylus touch 410. In this example, hand touch 412 is within touch restriction region 404, and is ignored. Touch sensor 402 still can receive touch inputs in regions outside of touch restriction region 404.

Figure 5:
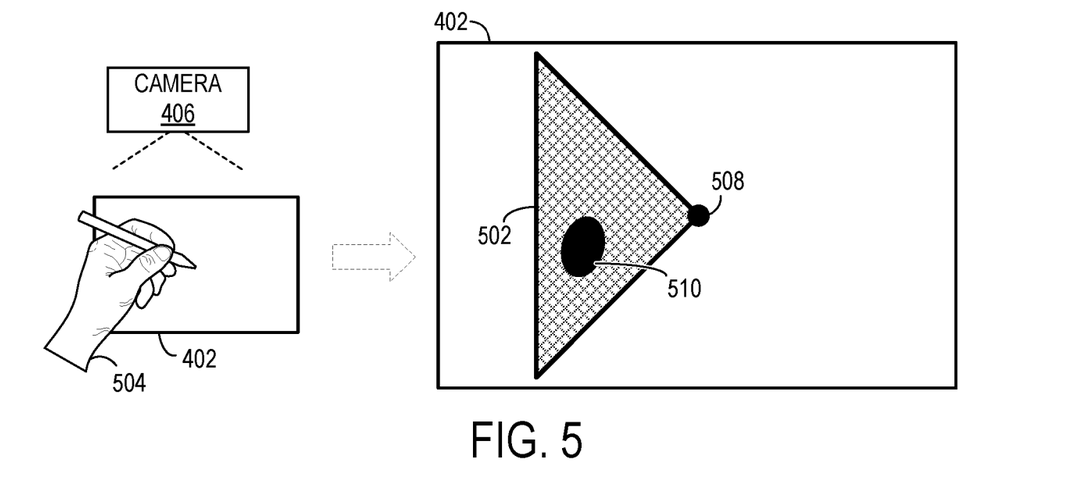

FIG. 5 schematically a touch restriction region 502 for a user determined to be left-handed based upon image data from camera 406. Here, touch restriction region 502 is defined to the left of a stylus touch input 508. Thus, a palm touch 510 in the touch restriction region 502 arising from left hand 504 is ignored, while touch sensor 402 can receive touch inputs in regions outside of touch restriction region 502. The use of image data from camera 408 to interpret handedness, either alone or fused with touch sensor data, may allow for a more certain determination of handedness than the use of touch sensor data alone. This may help to avoid ignoring intended touch inputs made in an erroneously determined touch restriction zone due to an incorrect handedness determination.

A determination of hand size may also be used to operate a touch restriction mode for a touch sensor. For example, it may be challenging to ensure that palm touches of a small hand will be properly rejected as not being intended touch inputs, while also ensuring that finger touches from a large hand will not be rejected. Current methods may use a same touch restriction mode based on a given average hand size, which does not dynamically change based on actual user hand sizes. Thus, image data may be used to determine a user's hand size, as described above. The determined hand size then may be classified into one of two or more predetermined classifications (e.g. small, nominal, or large). The classification then may be used to control operation of a touch sensor. For example, a classification may correspond to an estimated spatial area of sensing nodes a finger or palm is expected to cover on a touch sensor, such that the computing device can more easily distinguish when a user is placing a finger versus a palm on the touch sensor. Therefore, classifying the size of the user's hand may help the computing device to adjust decision boundaries for touch sensing and palm rejection.

Figure 6:
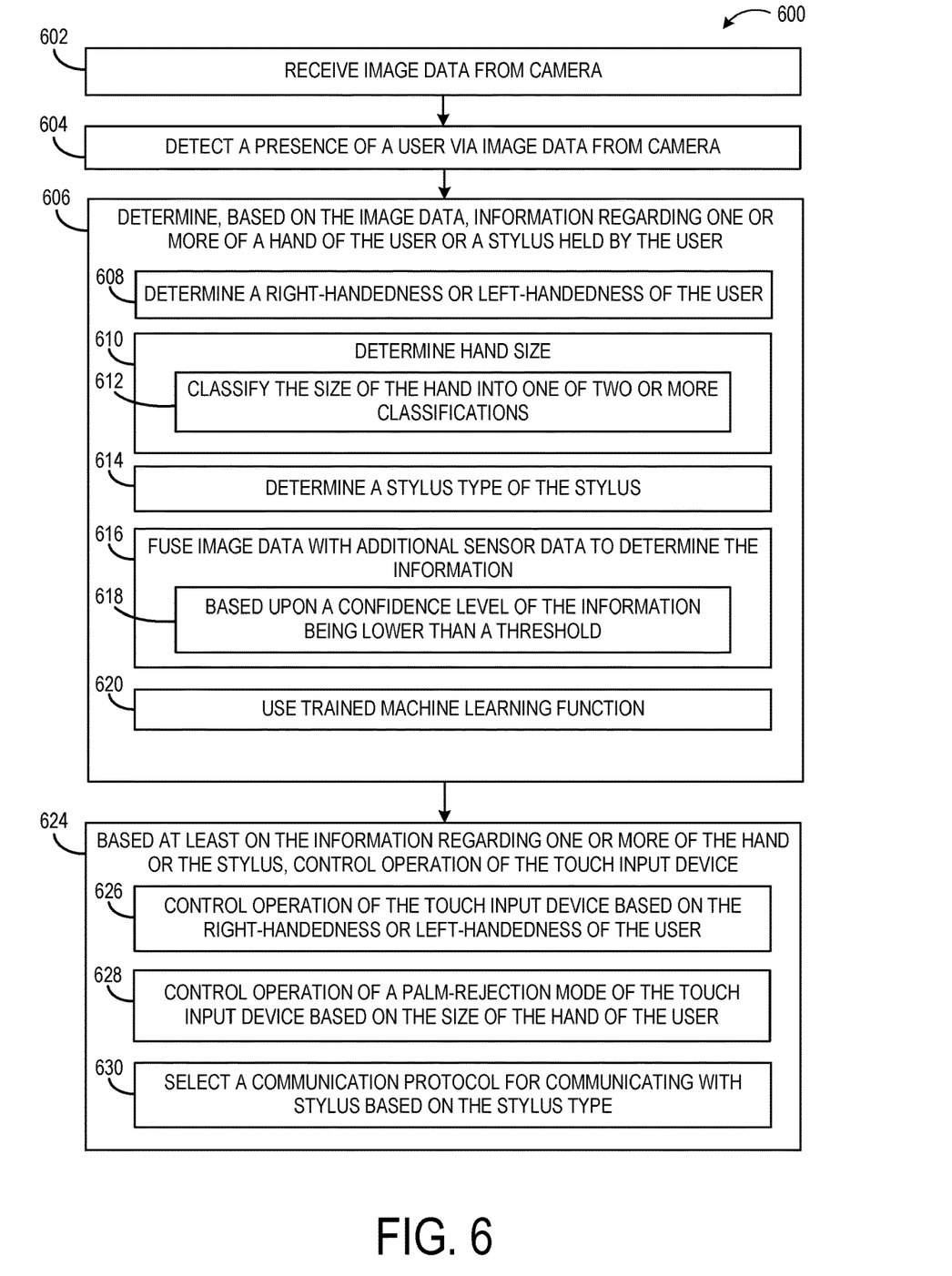
FIG. 6 shows a flow diagram depicting an example method of controlling operation of a touch sensor.

FIG. 6 shows a flow diagram depicting an example method 600 of controlling operation of a touch sensor based on image data from a camera. Method 600 may be implemented on any suitable computing device. In some examples, the computing device may comprise a human presence camera that provides image data to a secure image sensor processor separate from a general processor of the computing device.

Method 600 includes, at 602, receiving image data from the camera, and at 604, detecting a presence of a user via image data from the camera. Method 600 further includes, at 606, determining, based on the image data, information regarding one or more of a hand and a stylus captured in the image data. Determining such information may include, at 608, determining a right-handedness or a left-handedness of the user, and/or at 610, determining a hand size. In some examples, determining a hand size of the user may include, at 612, classifying the hand size into one of two or more classifications (e.g. small, medium, large). Determining such information at 606 also may comprise, at 614, determining a stylus type of the stylus.

In some examples, additional sensor data may be fused with the image data to determine the information regarding the hand and/or the stylus, as shown at 616. In some examples, fusing the image data with additional sensor data may include first determining a confidence level of the information determined based on the image data, and fusing the image data with additional sensor data based on the confidence level being lower than a threshold, as indicated at 618. In this manner, image data from the camera can be used to supplement data from other sensors, such as the touch sensor and/or a stylus grip sensor.

Any suitable method may be used to determine the information at 606. In some examples, rules-based approaches may be taken to determine such information as handedness, hand size, and/or stylus type. In other examples, as indicated at 620, one or more trained machine learning functions may be used to determine the information regarding the hand and/or stylus. In some such examples, image data may be processed by a trained machine learning model (e.g. a suitable neural network, such as a convolutional neural network, operating on a secure image sensor processor) to output a classification regarding hand size and/or a classification regarding handedness. Further, in some examples, the image data output from the camera may be combined with other sensor signals and input to a trained neural network to thereby fuse the data for the determination at 606.

Method 600 further includes, at 624, based at least on the information regarding one or more of the hand or the stylus, controlling operation of the touch sensor. Controlling operation of the touch sensor may include, at 626, controlling operation based on the right-handedness or left-handedness of the user. For example, the handedness of the user may be used to operate a palm-rejection algorithms or area around a stylus tip in which to receive inputs. Method 600 further may include, at 628, controlling operation of a palm-rejection mode of the touch sensor based on the hand size of the user. For example, a palm rejection region may be smaller for a hand classified as small and larger for a hand classified as large. Controlling operation of the touch sensor further may include, at 630, selecting a communication protocol for communicating with the stylus based on a determined stylus type.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
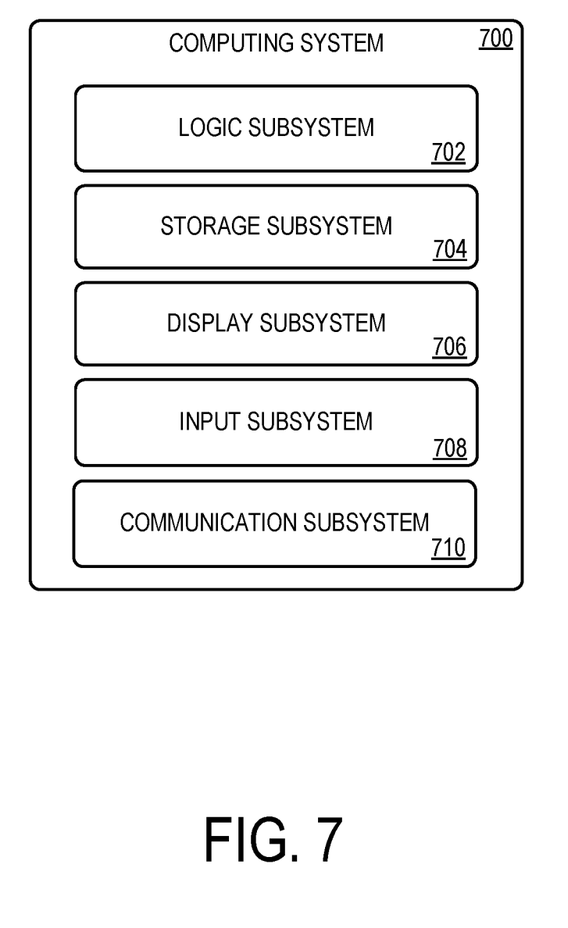
FIG. 7 shows a block diagram of an example computing system.

FIG. 7 schematically shows a block diagram of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), computing device 100, computing device 200, computing system 300, and/or other computing devices.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 702 may include one or more processors configured to execute software instructions. Additionally or alternatively, logic subsystem 702 may include one or more hardware or firmware logic machines configured to execute hardware or firmware instructions. Processors of logic subsystem 702 may be single-core or multi-core, and the instructions executed thereon may be configured for sequential, parallel, and/or distributed processing. Individual components of logic subsystem 702 optionally may be distributed among two or more separate devices, which may be remotely located and/or configured for coordinated processing. Aspects of logic subsystem 702 may be virtualized and executed by remotely accessible, networked computing devices configured in a cloud-computing configuration.

Storage subsystem 704 includes one or more physical devices configured to hold instructions executable by logic subsystem 702 to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by Storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a computing device comprising a touch sensor, a camera, a logic subsystem, and a storage subsystem comprising instructions executable by the logic subsystem to receive image data from the camera, determine, based on the image data, information regarding one or more of a hand of a user or a stylus held by the user, and based at least on the information regarding one or more of the hand of the user or the stylus held by the user, control operation of the touch sensor. In some such examples, the logic subsystem comprises an image sensor processor configured to process the image data and also comprises a system processor, and wherein the image sensor processor comprises instructions executable to output the information regarding one or more of the hand of the user and the stylus to the system processor. In some such examples, the instructions executable to control operation of the touch sensor alternatively or additionally are executable to determine, based on the image data, a right-handedness or a left-handedness of the user, and control operation of the touch sensor based at least on the right-handedness or left-handedness of the user. In some such examples, the instructions executable to control operation of the touch sensor alternatively or additionally are executable to determine, based on the image data, a hand size of the user, and control operation of the touch sensor based at least on the hand size of the user. In some such examples, the information regarding the stylus comprises a stylus type of the stylus, and wherein the instructions executable to control operation of the touch sensor alternatively or additionally are executable to select a communication protocol with which to communication with the stylus based on the stylus type. In some such examples, the instructions alternatively or additionally are executable to fuse the image data with additional sensor data to determine the information regarding one or more of the hand and the stylus. In some such examples, the additional sensor data alternatively or additionally comprises data from a grip sensor on the stylus. In some such examples, the instructions alternatively or additionally are executable to determine a confidence level of the information determined based on the image data, and fuse the image data with additional sensor data based upon the confidence level being lower than a threshold. In some such examples, the instructions alternatively or additionally are executable to determine the information regarding one or more of the hand and the stylus from the image data by applying a machine learning algorithm to the image data. In some such examples, the instructions alternatively or additionally are executable to determine that the camera is obstructed based at least upon the image data, and in response determine information regarding one or more of the hand of the user and the stylus based at least upon data received from one or more of the stylus or the touch sensor.

Another example provides, on a computing device comprising a touch sensor and a camera, a method of determining a touch-input mode for of the touch sensor. The method comprises receiving image data from the camera, determining, based on the image data, information regarding one or more of a hand of a user and a stylus held by the user, and based at least on the information regarding one or more of the hand of the user or the stylus held by the user, control operation of the touch sensor. In some such examples, the method further comprises determining, based on the image data, a right-handedness or a left-handedness of the user, and controlling operation of the touch sensor based at least on the right-handedness or left-handedness of the user. In some such examples, the method alternatively or additionally comprises determining, based on the image data, a hand size of the user, and controlling operation of the touch sensor based at least on the hand size of the user. In some such examples, the information regarding the stylus alternatively or additionally comprises a stylus type of the stylus, and the method alternatively or additionally further comprises selecting a communication protocol with which to communication with the stylus based on the stylus type. In some such examples, the method alternatively or additionally further comprises fusing image data with additional sensor data to determine the information regarding the one or more of the hand of the user or the stylus held by the user. In some such examples, the additional sensor data alternatively or additionally comprises data from a sensor on the stylus. In some such examples, the method alternatively or additionally further comprises determining a confidence level of the information determined based on the image data, and fusing the image data with additional sensor data based upon the confidence level being lower than a threshold. In some such examples, determining the information regarding one or more of the hand and the stylus from the image data alternatively or additionally comprises applying a machine learning algorithm to the image data.

Another example provides a computing device comprising a touch sensor; a camera; an image sensor processor configured to receive image data from the camera, and determine, based on the image data, information regarding one or more of a hand of a user or a stylus held by the user; and a system processor to receive the information regarding the one or more of the hand of the user or the stylus held by the user from the image sensor processor, and based at least on the information regarding the one or more of the hand of the user or the stylus held by the user, control operation of the touch sensor. In some such examples, the instructions executable to control operation of the touch sensor are executable to determine, based on the image data, one or more of a handedness of the user or a hand size of the user, and control operation of a palm-rejection mode of the touch sensor based at least on the one or more of the handedness of the user or the hand size of the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a touch sensor;
   a camera;
   a logic subsystem comprising a system processor and an image sensor processor configured to process image data from the camera; and
   a storage subsystem comprising instructions executable by the logic subsystem to:
     receive, at the image sensor processor, the image data from the camera,
     determine, using the image sensor processor and based on the image data, information regarding one or more of a hand of a user or a stylus held by the user,
     output the information regarding the one or more of the hand of the user and the stylus held by the user from the image sensor processor to the system processor, and
     based at least on the information regarding the one or more of the hand of the user or the stylus held by the user, control operation of the touch sensor using the system processor.

2. The computing device of claim 1, wherein the instructions executable to control operation of the touch sensor are executable to determine, based on the image data, a right-handedness or a left-handedness of the user, and control operation of the touch sensor based at least on the right-handedness or left-handedness of the user.

3. The computing device of claim 1, wherein the information regarding the stylus comprises a stylus type of the stylus, and wherein the instructions executable to control operation of the touch sensor are executable to select a communication protocol with which to communication with the stylus based on the stylus type.

4. The computing device of claim 1, wherein the instructions are executable to fuse the image data with additional sensor data to determine the information regarding one or more of the hand and the stylus.

5. The computing device of claim 4, wherein the additional sensor data comprises data from a grip sensor on the stylus.

6. The computing device of claim 4, wherein the instructions are executable to determine a confidence level of the information determined based on the image data, and fuse the image data with additional sensor data based upon the confidence level being lower than a threshold.

7. The computing device of claim 1, wherein the instructions are executable to determine the information regarding one or more of the hand and the stylus from the image data by applying a machine learning algorithm to the image data.

8. The computing device of claim 1, wherein the instructions are executable to determine that the camera is obstructed based at least upon the image data, and in response determine information regarding one or more of the hand of the user and the stylus based at least upon data received from one or more of the stylus or the touch sensor.

9. On a computing device comprising a touch sensor and a camera, a method of determining a touch-input mode for the touch sensor, the method comprising:
receiving image data from the camera;
determining, based on the image data, information regarding one or more of a hand of a user and a stylus held by the user, wherein the information regarding the hand of the user comprises a right-handedness or a left-handedness of the user; and
based at least on the information regarding the right-handedness or the left-handedness of the user, controlling operation of the touch sensor.

10. The method of claim 9, further comprising determining, based on the image data, a hand size of the user, and controlling operation of the touch sensor based at least on the hand size of the user.

11. The method of claim 9, wherein the information regarding the stylus comprises a stylus type of the stylus, and further comprising selecting a communication protocol with which to communication with the stylus based on the stylus type.

12. The method of claim 9, further comprising fusing image data with additional sensor data to determine the information regarding the one or more of the hand of the user or the stylus held by the user.

13. The method of claim 12, wherein the additional sensor data comprises data from a sensor on the stylus.

14. The method of claim 12, further comprising determining a confidence level of the information determined based on the image data, and fusing the image data with additional sensor data based upon the confidence level being lower than a threshold.

15. The method of claim 9, wherein determining the information regarding one or more of the hand and the stylus from the image data comprises applying a machine learning algorithm to the image data.

16. A computing device comprising:
a touch sensor;
a camera;
a logic subsystem; and
a storage subsystem comprising instructions executable by the logic subsystem to
receive image data from the camera,
determine, based on the image data, information regarding one or more of a hand of a user or a stylus held by the user, and
based at least on the information regarding one or more of the hand of the user or the stylus held by the user, control operation of the touch sensor, wherein the information regarding the hand of the user comprises information regarding a hand size of the user, and wherein the instructions are executable to control operation of the touch sensor based at least on the hand size of the user.

17. The computing device of claim 16, wherein the logic subsystem comprises an image sensor processor configured to process the image data and a system processor, and wherein the image sensor processor comprises instructions executable to output the information regarding one or more of the hand of the user and the stylus to the system processor.

18. The computing device of claim 16, wherein the instructions executable to control operation of the touch sensor are executable to determine, based on the image data, a right-handedness or a left-handedness of the user, and control operation of the touch sensor based at least on the right-handedness or left-handedness of the user.

19. The computing device of claim 16, wherein the instructions are executable to fuse the image data with additional sensor data to determine the information regarding one or more of the hand and the stylus.

20. The computing device of claim 19, wherein the instructions are executable to determine a confidence level of the information determined based on the image data, and fuse the image data with additional sensor data based upon the confidence level being lower than a threshold.

* * * * *